United States Patent [19]

Deutsch et al.

[11] Patent Number: 5,741,471
[45] Date of Patent: Apr. 21, 1998

[54] PROCESS FOR THE PREPARATION OF DISCRETE PARTICLES OF CALCIUM CARBONATE

[75] Inventors: Donald Richard Deutsch, Walnutport; Kenneth James Wise, Schnecksville, both of Pa.

[73] Assignee: Minerals Technologies Inc., New York, N.Y.

[21] Appl. No.: 567,754

[22] Filed: Dec. 5, 1995

[51] Int. Cl.$^6$ ............................................. C01F 11/18
[52] U.S. Cl. ..................................... 423/432; 423/430
[58] Field of Search ................................ 423/165, 432

[56] References Cited

U.S. PATENT DOCUMENTS

| | | |
|---|---|---|
| 2,188,663 | 1/1940 | McClure et al. . |
| 2,467,082 | 4/1949 | Fleck . |
| 3,320,026 | 5/1967 | Waldeck ............................ 423/432 |
| 3,443,890 | 5/1969 | Sisson et al. . |
| 3,669,620 | 6/1972 | Bennett et al. ...................... 423/432 |
| 4,018,877 | 4/1977 | Woode . |
| 4,237,147 | 12/1980 | Merten et al. . |
| 5,296,002 | 3/1994 | Passaretti ........................... 423/432 |
| 5,332,564 | 7/1994 | Chapnerkar et al. . |
| 5,558,850 | 9/1996 | Bleakley et al. .................... 423/432 |

FOREIGN PATENT DOCUMENTS

| | | | |
|---|---|---|---|
| 207714 | 9/1987 | Japan ................................ 423/432 |
| 301510 | 12/1989 | Japan ................................ 423/432 |
| 157030 | 6/1994 | Japan ................................ 423/432 |
| 831921 | 4/1960 | United Kingdom ................ 423/432 |

OTHER PUBLICATIONS

Robert S. Boynton, *Chemistry and Technology of Lime and Limestone*, Interscience Publishers (1966), pp.287–289.

*Primary Examiner*—Wayne Langel
*Attorney, Agent, or Firm*—Marvin J. Powell; Terry B. Morris

[57] ABSTRACT

A process for the precipitation of discrete prismatic calcium carbonate particles by carbonation of aqueous calcium hydroxide containing a saccharide or polysaccharide or a saccharide or polysaccharide and a metal ion at temperatures of from about 8° C. to about 64° C. is disclosed. The resulting product has specific surface areas between about 10 m$^2$/g and about 120 m$^2$/g and is useful in paints, plastics, paper coating, paper filling, and pharmaceutical applications.

8 Claims, No Drawings

PROCESS FOR THE PREPARATION OF DISCRETE PARTICLES OF CALCIUM CARBONATE

FIELD OF THE INVENTION

The present invention concerns precipitated calcium carbonate. More specifically, it concerns a novel method of preparing discrete particles of prismatic calcium carbonate of varying particle size by carbonating an aqueous lime slurry in the presence of saccharides or polysaccharides and optionally other metal salts.

BACKGROUND OF THE INVENTION

Precipitated calcium carbonate (PCC) is commonly prepared by carbonating an aqueous calcium hydroxide slurry with a carbon dioxide containing gas while controlling temperature to obtain calcium carbonate particles of about 0.5 micron to 10 micron average particle size. Heat aging is also used as a mechanism to effect the size and size distribution of the final product. Such calcium carbonate products are useful as fillers in paper, as pigments for coated paper, as pigments for paints and polymer applications, and also find use in the pharmaceutical industry.

When attempting to produce precipitated calcium carbonate much smaller than 0.5 micron average particle size it is necessary to use low calcium hydroxide concentrations, low temperatures, and sometimes low levels of a size controlling agent. However, most processes still remain difficult to control and the calcium carbonate particle size is not very predictable.

What has been found to be novel and unanticipated by the prior art is an improved process for selectively producing discrete calcium carbonate particles of from about 0.5 microns to about 0.018 microns.

It is therefore an object of the present invention to provide a simple, predictable process for the preparation of calcium carbonate particles in a wide range of particle sizes. Another object of the present invention is to provide calcium carbonate products that are especially useful in the paint, plastics, pharmaceutical and paper industries. These and other objects of the present invention will become apparent as further provided in the detailed description which follows.

PRIOR RELATED ART

U.S. Pat. No. 5,332,564 discloses a process for producing rhombic or barrel shapped PCC comprising slaking quicklime in an aqueous sugar solution to form a slaked lime slurry carbonating said lime slurry at 40°-80° F with carbon dioxide containing gas until about neutral (pH 7-8) to SSA 2-20 $m_2$/g.

U.S. Pat. No. 4,237,147 discloses a process for preparing a dry carbonated beverage concentrate for preparing a carbonated beverage comprising (a.) amorphous calcium carbonate and (b.) an anhydrous nontoxic acid in an amount to completely evolve all the carbon dioxide gas from the amorphous calcium carbonate. Sugar is employed in the precipitation of the calcium carbonate and results in fines on the edges of irregular agglomerated particles.

U.S. Pat. No. 4,018,877 describes an improved process for producing calcium carbonate by introducing a complexing agent into the calcium carbonate slurry either during or after the "primary nucleation stage." The complexing agent is selected from a group which includes sucrose or glucose.

U.S. Pat. No. 3,443,890 describes a process for producing precipated calcium carbonate by carbonating an aqueous calcium hydroxide slurry in the presence of saccharides and a second active compound selected from the group consisting of active $SiO_2$ compounds.

U.S. Pat. No. 2,467,082 discloses a process for producing chalk by carbonating an aqueous calcium hydroxide slurry in the presence of sugar beet residue extract.

U.S. Pat. No. 2,188,633 discloses the use of saccharides and polyvinyl alcohol as an additive to an aqueous calcium hydroxide slurry prior to carbonation to form a calcium carbonate product.

In view of the above, there is nothing in the patent literature which suggests that the use of sucrose alone or in combination with aluminum sulfate hydrate (alum) and temperature control of the calcium hydroxide slurry during carbonation that would result in the present invention.

SUMMARY OF INVENTION

In the novel process for producing discrete prismatic calcium carbonate particles having a specific surface area of from about 10 to about 120 $m^2$/g, saccharides or polysaccharides are used either alone or in combination with other metal salts to effect the particle size.

The calcium carbonate product is useful as pigment in the paint and plastics industry, as pigment in paper coating, and as filler in papermaking.

DETAILED DESCRIPTION OF THE INVENTION

We have now found that precipitation of calcium carbonate by carbonation of aqueous lime slurries containing a saccharide or polysaccharide or a saccharide or a polysaccharide and a metal salt at temperatures of from about 8° C. to about 64° C. consistently produces the desired calcite product with specific surface areas (SSA) in the range of from about 10 $m^2$/g to about 120 $m^2$/g.

Accordingly, the present invention entails a process for the preparation of discrete particles of a prismatic calcium carbonate which comprises introducing carbon dioxide into an aqueous slurry of from about 1 weight percent to about 30 weight percent calcium hydroxide containing a saccharide, or polysaccharide and optionally a metal salt. The preferred process entails the use of from about 0.1 weight percent to about 5.0 weight percent saccharide or polysaccharide and optionally from about 0.1 weight percent to about 5.0 weight percent metal salt, starting the introduction of carbon dioxide at a temperature of from about 8° C. to about 64° C. and continuing the introduction until the calcium carbonate precipitation is substantially complete.

Preferably the calcium hydroxide slurry concentration is from about 5 weight percent to about 25 weight percent. The amount of sucrose present in the calcium hydroxide is more preferably about 0.5 weight percent or the amount of sucrose and alum present in the calcium hydroxide is about 0.5 weight percent and 4.0 weight percent respectively. Vigorous agitation is used during the carbonation process, which process should take no more than about 80 or 90 minutes to complete.

The saccharide or polysaccharide useful in the present invention is selected from the group consisting of sucrose, glucose, fructose, raw sugar, molasses, gums, starches, and other organic compounds similar in nature. Preferably the saccharide or polysaccharide is sucrose. Various inorganic metal salts, especially of gel forming metals such as Si, Mn, Zn, Zr, and $Al_2$ are useful in the process of the present invention. Preferably the metal salt is aluminum sulfate hydrate (Alum).

All percentages used herein are weight percent, and when they describe the amount of additive used they are weight percent based on the calcium carbonate equivalent of the available lime.

The nature of the carbon dioxide containing gas is not particularly critical in that pure carbon dioxide gas can be employed or standard mixtures of carbon dioxide in either air or nitrogen. Liquid carbon dioxide as well, can be used in accordance with the present invention.

While the present process is applicable to all concentrations of lime slurries which can be carbonated, it is practically limited to those slurries in which the calcium hydroxide concentration of the starting slurry is greater than about 5 weight percent. This is because precipitated calcite of the desired particle size can be realized under the present carbonation conditions with slurries having an initial calcium hydroxide concentration of about 5 percent or less even in the absence of the additives. Such low concentrations, however, are not economical. For most economical operation, the concentration of the calcium hydroxide in the slurry to be carbonated is preferably from about 10 to 20 percent by weight.

The carbonation of the lime slurry is continued until calcite precipitation is substantially complete, preferably being terminated when the pH of the carbonated slurry is about 7. Such carbonation is usually accomplished in a period of about one hour and one half. Normal care is exercised to neutralize any unreacted calcium hydroxide still present in the carbonated slurry. Various techniques known to those skilled in the art can be used to accomplish this neutralization. These include, for example, monitoring the slurry pH with the introduction of additional carbon dioxide gas as necessary as well as treating the carbonated slurry with a sufficient amount of an organic or inorganic polybasic acid such as citric, maleic, malic, malonic, phthalic, tartaric, boric, phosphoric, sulfurous or sulfuric acid. The calcium carbonate in the final slurry may be utilized as such, or may be filtered, dried and milled for use as a dry product.

Provided the reactants are of sufficient purity, the product resulting from the process of the instant invention is sufficiently pure to readily meet the USP specification for precipitated calcium carbonate. The product will typically analyze, when using methods specified by USP, to greater than 98.0 percent calcium carbonate.

The product is useful as a pigment in plastics and paint applications. It is especially useful as a pigment for paper coating and as a filler or retention aid in papermaking.

The size of the discrete particles of prismatic calcium carbonate being extremely small (0.5μ to 0.018μ) is more accurately determined and expressed by the specific surface area measurement. The specific surface area (SSA) of the products are determined using a Micromeritics FLOW-CARB II 2300 which employs BET theory with nitrogen as the absorbing gas. By "prismatic calcium carbonate" we mean that the particles have a generally prismatic shape and the aspect ratio (L/W) averages 2.0 or less as described in U.S. Pat. No. -3,320,026 to Waldeck and in *Pigments for Paper* (TAPPI Press) edited by Robert W. Hagemeyer.

The following examples are merely illustrative of the process of the present invention and are not to be construed as limiting the invention, the scope of which is defined by the appended claims.

EXAMPLE 1

A 4-liter jacketed, baffled, cylindrical stainless steel reactor, having an internal diameter of 13.5 cm, a height of 38 cm and a hemispherical bottom, equipped with a high-speed agitator having two 5 cm diameter flat blade turbine impellers positioned about 1.5 cm and 5.5 cm from the bottom and driven by a 1/15 hp variable speed motor, and a 0.3 cm inside diameter stainless steel tube curved under the center of the bottom blade for the introduction of a carbon dioxide/air stream, was used for preparation and reaction of calcium hydroxide (slake) to make precipitated calcium carbonate (PCC). A 13.4 weight percent (0.1443 g/cc) aqueous calcium hydroxide slurry was prepared by adding 200 grams of granular active lime from Specialty Minerals Inc., hereinafter referred to as Adams lime, having an available calcium oxide content of about 94 or more weight percent as determined by ASTM procedure C-25-72, to 1000 ml of water in the above described 4-liter reactor at 25 °C. and stirred at 1000 RPM for 10 minutes. The slurry was diluted to about 10.2 weight percent (0.1080 g/cc), screened through a 60 mesh screen to remove grit and cooled in the reactor to 25 °C. The agitator was adjusted to 1250 RPM and 0.1 percent sucrose by weight, based on the calcium carbonate equivalent of the available lime, was added to the slurry. The calcium hydroxide slurry was carbonated to precipitate calcium carbonate by introducing a gas mixture of 28 volume percent carbon dioxide in air at 4.4 standard liters per minute (SLM) into the slurry. The carbonation continues until the pH value was less than 7.4. The slurry was passed through U.S. standard No. 325 (44 microns) sieve to remove grit.

The slurried product was shown by SEM to be well dispersed and quite discrete. A portion was then vacuum filtered on a Buchner funnel, acetone washed, and the subsequent filter cake dried at 120° C. for at least one hour to give a PCC product having a specific surface area (SSA) of 34.6 m²/g. This run is identified as Example 1 in Table 1.

EXAMPLE 2

Two additional discrete precipitated calcium carbonate particles of varying surface areas were prepared by using the process described in Example 1 but having higher sucrose levels as designated in Examples 2 and 2A in Table 1.

EXAMPLE 3

Three more experiments were conducted by using the same process but in these cases lime from Germany Valley (G.V.) Limestone Company was carbonated at 35° C. instead of 25 °C. Sucrose was added at 0.5 percent, 1.0 percent, and 4.5 percent as shown in Table 1 Examples 3, 3A and 3B. The particle size of PCC. has been shown to be affected by the addition of various reagents. The level of sucrose, at a specific temperature determines the particle size (surface area) of the synthesized PCC. as shown in Table 1. The table also shows effects of sucrose levels at two temperatures 25° C. and 35° C. and comparison of two limes—Adams and Germany Valley.

TABLE 1

| Example No. | Lime Type | Carbonation Temperature (°C.) | Sucrose Level (%) | SSA (m²/g) |
| --- | --- | --- | --- | --- |
| 1 | Adams | 25 | 0.1 | 34.6 |
| 2 | Adams | 25 | 0.5 | 42.4 |
| 2A | Adams | 25 | 2.0 | 53.2 |
| 3 | G.V. | 25 | 0.5 | 46.2 |
| 3A | G.V. | 35 | 0.5 | 36.4 |
| 3B | G.V. | 35 | 1.0 | 41.3 |
| 3C | G.V. | 35 | 4.5 | 61.1 |

Examples 3 and 3A show a decrease in SSA with an increase in temperature. Examples 2 and 3 indicate a small difference in SSA between products made with different limes. The increase in sucrose gives an obvious increase in SSA (decrease in particle size).

Although the particle size can be determined by setting the level of sucrose between from about 0.1 percent and about 5 percent, in many cases it is more desirable to maintain a low sucrose level to avoid browning upon drying. The preferred range of sucrose is 0.1 to 1.0 percent and more preferably about 0.5 percent.

EXAMPLE 4

To demonstrate the effect of changing temperature while carbonating at a sucrose level of 0.5 percent, a series of six experiments, Example 4 through 4E, were carried out from 10° C. to 55 °C. by using the process as described in Example 1 and the carbonation temperatures are indicated for each respective experiment. Germany Valley lime was used for Example 4E while Adams lime was used for the others. The results are tabulated in Table 2.

EXAMPLE 5

A 70-gallon modified mortar mixer was used to prepare calcium hydroxide slurry (slake) for a scaled-up carbonation. The carbonation was carried out in a 30-liter jacketed, baffled cylindrical stainless steel reactor having an internal diameter of 11.5 inches, a height of 20 inches, and having a hemispherical bottom. The reactor was equipped with a high-speed agitator having two 4.5 inch diameter flat blade turbine impellers positioned about 4 inches and 8 inches from the bottom and driven by a 5 HP variable speed motor. It was also equipped with an 0.25 inch inside diameter stainless steel tube curved under the center of the bottom of the blade for the introduction of a carbon dioxide/air stream. A 20.1 weight percent (0.2257 g/cc) aqueous calcium hydroxide slurry was prepared by adding 2000 g of granular active lime from Specialty Minerals Inc. having an available calcium oxide content of about 94 or more weight percent as determined by ASTM procedure C-25-72, to 10.0 liters of water in the above described 70 gallon mortar mixer, at 50° C. and stirred for 10 minutes. The slurry was diluted to about 10.2 weight percent (0.1080 g/cc), screened through a 60 mesh screen to remove grit and heated in the reactor to 60° C. The agitator was adjusted to 615 RPM and 0.5 percent sucrose by weight, based on the calcium carbonate equivalent of the available lime, was added to the slurry. The calcium hydroxide slurry was carbonated to precipitate calcium carbonate by introducing a gas mixture of 28 volume percent carbon dioxide in air at 1.47 standard cubic feet per minute SCFM into the slurry. The carbonation was continued until the pH was less than 7.4. The slurry was passed through U.S. Standard No. 325 (44 microns) sieve to remove grit. The slurried product was shown by SEM to be well dispersed and quite discrete. A portion was then vacuum filtered on a Buchner funnel, acetone washed, and the subsequent filter cake dried at 120° C. for at least one hour to give a PCC. product having a specific surface area (SSA) of 11.1 m²/g (see Table 2, Example 5).

The reaction temperature is proportional to the reaction rate, meaning, the higher the temperature the faster the reaction and it is also related to the crystal size. Higher reaction temperatures produce larger PCC. crystals. By adding a reagent that interacts with the Ca(OH)$_2$ the crystal size is modified. In Table 2 0.5 percent sucrose allows the synthesis of a broad range of particles without exhibiting the typical quantum change. In this case 50° change in temperature produced about 60 m²/g change in specific surface areas. Example 5 indicates that scale-up of the reaction gives results that agree with the 4-liter laboratory trials.

TABLE 2

| Example No. | Reaction Size | Carbonation Temperature (°C.) | SSA (m²/g) |
|---|---|---|---|
| 4 | 4L | 10° | 69.6 |
| 4A | 4L | 25° | 42.4 |
| 4B | 4L | 35° | 36.4 |
| 4C | 4L | 38° | 29.2 |
| 4D | 4L | 50° | 25.2 |
| 4E | 4L | 55° | 21.7 |
| 6 | 30L | 62° | 11.1 |

EXAMPLE 5

A discrete precipitated calcium carbonate was prepared using a 12.4 weight percent (0.1325 g/cc) aqueous calcium hydroxide slurry prepared by adding 150 g of granular active lime from Specialty Minerals Inc., to 1200 ml of water in the 4-liter reactor described in Example 1, at 65° C. and stirred at 1000 RPM for 10 minutes, the slurry was diluted to about 7.6 weight percent (0.0799 g/cc), screened through a 60 mesh screen to remove grit, cooled in the reactor to 12.0° C. and the agitator was adjusted to 1250 RPM. During the cooling process, 0.5 percent sucrose by weight based on the theoretical PCC, was added to the slurry in addition to 3.15 percent aluminum sulfate hydrate based on theoretical PCC, solubilized to a 10 percent by weight solution in water. The calcium hydroxide slurry was carbonated to precipitated calcium carbonate by introducing a gas mixture of 28 volume percent carbon dioxide in air at 7.3 standard liters per minute (SLM) into the slurry while holding the reaction temperature close to isothermal conditions by running chilled water through the vessel jacket.

The carbonation was continued until a pH value of less than 7.4. The slurry was passed through U.S. Standard No. 325 (44 micron) sieve to remove grit and a portion was then vacuum filtered on a Buchner funnel, acetone washed, the subsequent filter cake was dried at 120° C. for more than 1 hour to give a PCC. product having a specific surface area (SSA) of 111.7 m²/g. See Example 5 in Table 3.

EXAMPLE 7

Two experiments were run in the 4-liter equipment as described in Example 6 using 0.5 percent sucrose and 3.15 percent alum but using carbonation temperatures of 20° and 25° instead of 12° C. These experiments produced products with specific surface area values of 92.3 and 78.4 m²/g respectively, as shown in Table 3, as Examples 7 and 7A respectively.

EXAMPLE 8

An experiment was conducted in the 30-liter equipment as described in Example 4 but using 0.5 percent sucrose and 3.15 percent alum rather than sucrose alone as was described in Example 5. In this experiment 1700 grams of lime and was used and was carbonated at 38 °C at a rate of 16 SLM CO$_2$ to give a specific surface area of 67.5 m²/g.

The four sucrose/alum experiments (Examples 6, 7, 7A, and 8) are compared with Examples 4, 4A, 4B, 4C, which were synthesized using only sucrose and temperature selection (from Table 2).

By adding 3.15 percent alum to 0.5 percent sucrose prior to carbonation, the particle size can be further reduced over use of sucrose alone. The surface area is increased about 35 m²/g for the same reaction temperature to about 113 m²/g at 10° C. By using sucrose and a combination of sucrose and alum, the specific surface area is extended to a range of about 10 to 115 m²/g (compare data from Tables 2 and 3).

TABLE 3

| Example No. | Additive Level (%) | Carbonation Temperature (°C.) | SSA (m²/g) |
|---|---|---|---|
| 4 | 0.5% sucrose | 10° | 69.6 |
| 4A | 0.5% sucrose | 25° | 42.4 |
| 4B | 0.5% sucrose | 35° | 36.4 |
| 4C | 0.5% sucrose | 38° | 29.2 |
| 6 | 0.5% sucrose/3.15% alum | 12° | 112 |
| 7 | 0.5% sucrose/3.15% alum | 20° | 92.3 |
| 7A | 0.5% sucrose/3.15% alum | 25° | 78.4 |
| 8 | 0.5% sucrose/3.15% alum | 38° | 67.5 |

Precipitated calcium carbonate finds many applications in a variety of markets. The breadth of the range of particle sizes of the PCCs of this invention allows even broader application. The direct synthesis approach which can minimize or eliminate the need for aging will allow a more economical substitution for standard fine products used in many applications. The elimination of chilling required for some standard products will further reduce the cost of these novel products. Table 4 shows typical examples of applications for these products.

TABLE 4

| Additive | Temperature (°C.) | SSA (m²/g) | Application | Type |
|---|---|---|---|---|
| sucrose | *~60 | ~8–12 | paper coating | replacement/new |
| sucrose | ~55 | ~17 | sealants | replacement |
| sucrose | ~50 | ~20 | sealants | replacement |
| sucrose | ~45 | ~26 | sealants | replacement |
| sucrose | ~25 | ~45 | ink jet coating retention aid | new |
| sucrose/alum | ~35 | ~80 | ink jet coating retention aid | new |
| sucrose/alum | ~10–25 | ~90–115 | retention aid pharmaceutical | new |

*— Denotes approximately

We claim:

1. A process for the preparation of discrete particles of prismatic calcium carbonate comprising preparing a first calcium hydroxide slurry from calcium oxide and water, subsequently adding to said first slurry from about 0.1 weight percent to 5.0 weight percent of a saccharide or polysaccharide to form a second calcium hydroxide slurry, and while rapidly agitating, carbonating the thus prepared second calcium hydroxide slurry until the carbonation is substantially complete so as to obtain said discrete particles of prismatic calcium carbonate, said carbonation being started at a temperature of from about 8° C. to about 64 °C.

2. The process of claim 1 wherein the second calcium hydroxide slurry concentration is from about 5.0 weight percent to about 25 weight percent calcium hydroxide.

3. The process of claim 1 wherein the saccharide or polysaccharide is sucrose present in an amount of from about 0.1 weight percent to about 1.0 weight percent based on the calcium carbonate equivalent of the available lime.

4. The process of claim 1 wherein, after the carbonation is substantially complete, the carbonated slurry is treated with sufficient polybasic acid to essentially neutralize any unreacted calcium hydroxide in the carbonated slurry.

5. A process for the preparation of discrete particles of prismatic calcium carbonate comprising preparing a first calcium hydroxide slurry from calcium oxide and water, subsequently adding to said first slurry from about 0.1 weight percent to 0.5 weight percent of a saccharide or polysaccharide and from about 0.1 weight percent to about 5.0 weight percent of a metal salt to form a second calcium hydroxide slurry and while rapidly agitating, carbonating the thus prepared second calcium hydroxide slurry until the carbonation is substantially complete so as to obtain said discrete particles of prismatic calcium carbonate, said carbonation being started at a temperature of from about 8° C. to about 64 °C.

6. The process of claim 5 wherein the second calcium hydroxide slurry concentration is from about 5.0 weight percent to about 25 weight percent calcium hydroxide.

7. The process of claim 5 wherein the saccharide or polysaccharide is sucrose present in an amount of about 0.5 weight percent and the metal salt is aluminum sulfate hydrate present in an amount of about 4.0 weight percent.

8. The process of claim 5 wherein after the carbonation is substantially complete, the carbonated slurry is treated with sufficient polybasic acid to essentially neutralize any unreacted calcium hydroxide in the carbonated slurry.

* * * * *